(12) United States Patent
Pasquero et al.

(10) Patent No.: US 9,066,310 B2
(45) Date of Patent: Jun. 23, 2015

(54) NON-VISUAL REPRESENTATION OF A CURRENT GAUGE VALUE OF AN ELECTRONIC DEVICE ON A CONTINUUM

(75) Inventors: Jerome Pasquero, Kitchener (CA); Norman Miner Ladouceur, Wingham (CA); Steven Henry Fyke, Waterloo (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 115 days.

(21) Appl. No.: 13/466,358

(22) Filed: May 8, 2012

(65) Prior Publication Data

US 2013/0303191 A1    Nov. 14, 2013

(51) Int. Cl.
| | | |
|---|---|---|
| H04W 24/00 | (2009.01) |
| H04W 68/00 | (2009.01) |
| G06F 3/01 | (2006.01) |
| H04M 1/02 | (2006.01) |
| H04M 1/725 | (2006.01) |
| H04M 19/04 | (2006.01) |

(52) U.S. Cl.
CPC .............. *H04W 68/00* (2013.01); *G06F 3/016* (2013.01); *H04M 19/047* (2013.01); *H04M 1/0202* (2013.01); *H04M 1/72522* (2013.01)

(58) Field of Classification Search
CPC ....................................................... H04W 4/02
USPC ............ 455/456.3, 569.1, 573, 567; 370/242
See application file for complete search history.

(56) References Cited

U.S. PATENT DOCUMENTS

| | | | |
|---|---|---|---|
| 5,032,835 A | 7/1991 | DeLuca | |
| 6,823,200 B2 | 11/2004 | Rekimoto et al. | |
| 7,136,894 B2 | 11/2006 | Britt, Jr. | |
| 7,378,939 B2 | 5/2008 | Sengupta et al. | |
| 2002/0067660 A1* | 6/2002 | Bokhour ........................ 367/128 |
| 2002/0177471 A1 | 11/2002 | Kaaresoja et al. | |
| 2005/0239479 A1* | 10/2005 | Bednasz .................... 455/456.1 |
| 2007/0072601 A1* | 3/2007 | Kim et al. ...................... 455/423 |
| 2007/0176742 A1 | 8/2007 | Hofmann et al. | |
| 2009/0027842 A1 | 1/2009 | Sandell et al. | |
| 2009/0156266 A1 | 6/2009 | Linjama et al. | |
| 2009/0289778 A1 | 11/2009 | King | |
| 2010/0134261 A1 | 6/2010 | Heimendinger | |

(Continued)

FOREIGN PATENT DOCUMENTS

| | | |
|---|---|---|
| EP | 1600907 | 11/2005 |
| GB | 2352136 | 1/2001 |
| WO | WO 2004071113 | 8/2004 |

OTHER PUBLICATIONS

European Search Report, EP12167207.5, Oct. 9, 2012.

(Continued)

*Primary Examiner* — Chuck Huynh
(74) *Attorney, Agent, or Firm* — Fleit Gibbons Gutman Bongini & Bianco P.L.

(57) ABSTRACT

A quantity that falls within a defined continuum defined by first and second end points of a gauge is communicated. Non-visual notifications indicate where on the continuum a current gauge value associated with a function of an electronic device resides relative to at least one end point of the first and second end points of the continuum. The non-visual notifications include a non-visual notification of the at least one end point of the continuum and a non-visual notification of the current gauge value.

20 Claims, 6 Drawing Sheets

(56) References Cited

U.S. PATENT DOCUMENTS

2010/0279746 A1 11/2010 Self
2010/0302003 A1 12/2010 Zellner
2011/0012796 A1* 1/2011 Kim et al. .................... 343/702
2011/0163860 A1 7/2011 Ryu et al.

OTHER PUBLICATIONS

European Search Report, EP12167207.5, Mar. 22, 2013.

* cited by examiner

200

210 — DETERMINE A CURRENT GAUGE VALUE ASSOCIATED WITH A FUNCTION OF AN ELECTRONIC DEVICE

220 — PROVIDE NON-VISUAL NOTIFICATIONS THAT INDICATE WHERE ON A CONTINUUM THE CURRENT GAUGE VALUE RESIDES RELATIVE TO AT LEAST ONE END POINT OF THE FIRST AND SECOND END POINTS OF THE CONTINUUM, WHEREIN THE NON-VISUAL NOTIFICATIONS COMPRISE A NON-VISUAL NOTIFICATION OF THE AT LEAST ONE END POINT OF THE CONTINUUM AND A NON-VISUAL NOTIFICATION OF THE CURRENT GAUGE VALUE

230 — PROVIDE AN ALERT INDICATION OF WHERE THE CURRENT GAUGE VALUE RESIDES RELATIVE TO AT LEAST ONE OF THE AT LEAST ONE END POINT AND THE CURRENT GAUGE VALUE HAS CHANGED

310 — DETERMINE A CURRENT GAUGE VALUE ASSOCIATED WITH A FUNCTION OF AN ELECTRONIC DEVICE

320 — DETERMINE A USAGE MODE OF THE ELECTRONIC DEVICE

330 — PROVIDE NON-VISUAL NOTIFICATIONS THAT INDICATE WHERE ON A CONTINUUM THE CURRENT GAUGE VALUE RESIDES RELATIVE TO AT LEAST ONE END POINT OF THE FIRST AND SECOND END POINTS OF THE CONTINUUM, WHEREIN THE NON-VISUAL NOTIFICATIONS COMPRISE A NON-VISUAL NOTIFICATION OF THE AT LEAST ONE END POINT OF THE CONTINUUM, AND A NON-VISUAL NOTIFICATION OF THE CURRENT GAUGE VALUE IN ACCORDANCE WITH THE USAGE MODE OF THE ELECTRONIC DEVICE

340 — PROVIDE AN ALERT INDICATION OF WHERE THE CURRENT GAUGE VALUE RESIDES RELATIVE TO AT LEAST ONE OF THE AT LEAST ONE END POINT AND THE CURRENT GAUGE VALUE HAS CHANGED

*FIG. 3*

NON-VISUAL REPRESENTATION OF A CURRENT GAUGE VALUE OF AN ELECTRONIC DEVICE ON A CONTINUUM

TECHNICAL FIELD

The present disclosure relates to communicating a current gauge value associated with a function of an electronic device and where on a continuum the current gauge value falls.

BACKGROUND

Electronic devices, including mobile electronic devices, such as mobile phones, cellular phones, smart phones, personal digital assistants (PDAs), digital cameras, wireless organizers, wirelessly enabled notebook computers, tablet computing devices, handheld electronic gaming devices, digital photograph albums, and the like, have associated with them a variety of device functions whose current status may be of interest. Values that indicate the current state of a function may convey important information about the operating status of the electronic device. For example, the current volume of the electronic device, the current antenna strength experienced by the electronic device, and the current distance to a static target are all information of interest to a user of the device.

While a user of an electronic device may be notified of new events, such as a new e-mail or a new call waiting, etc., event notifications are different from notification of where a current functional value of interest falls over a continuum. There is a need for users of electronic devices to be notified of the current gauge value of various device functions and where the current gauge value falls over a defined continuum.

BRIEF DESCRIPTION OF THE DRAWINGS

Example embodiments of the present disclosure will be described below with reference to the included drawings such that like reference numerals refer to like elements and in which:

FIG. 2 is a flow 200 that illustrates an example method for communicating a quantity that falls within a defined continuum defined by first and second end points, in accordance with the present disclosure.

FIG. 3 is a flow 300 that illustrates an alternate method for communicating a quantity that falls within a defined continuum defined by first and second end points, in accordance with the present disclosure.

DETAILED DESCRIPTION

Figure 1:
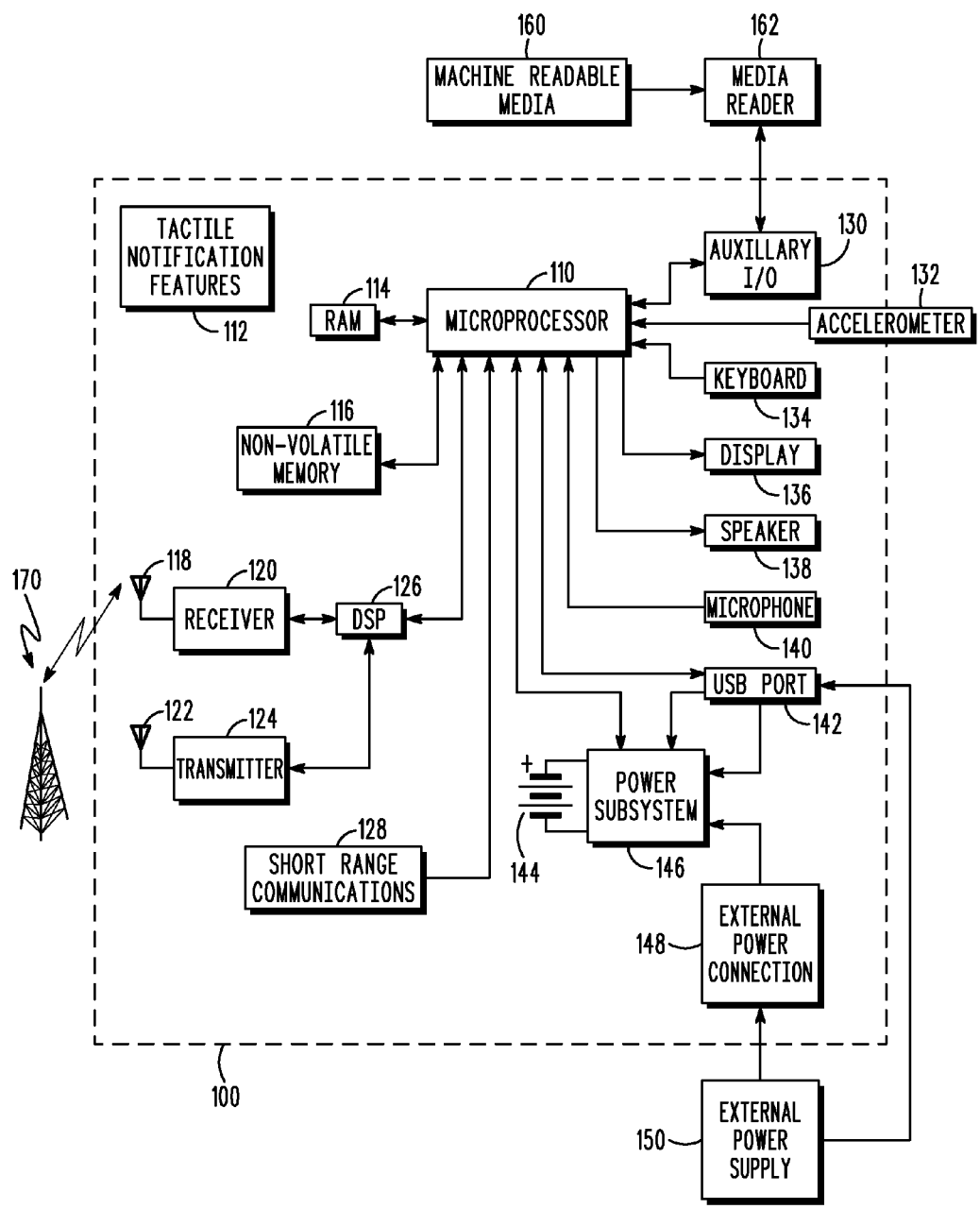
FIG. 1 is a block diagram of an example electronic device 100, in accordance with the present disclosure.

While non-visual notification signals, including tactile and/or auditory notifications, may be used to notify electronic device users of a new discrete event, such as the arrival of new mail or a call waiting, the present disclosure provides for a current gauge quantity or value associated with a function of an electronic device and shows where the current gauge quantity falls on a defined continuum to be communicated in a way that does not interfere with normal operation of the device. The type of information communicated non-visually can be compared to what a measurement gauge would measure. As with any type of gauge, the minimum and maximum points are clearly defined and the current state falls somewhere between the minimum and maximum points of the continuum. Examples of the type of functional information of interest to a user of the electronic device includes the battery level of the device, the wireless signal strength of the device, the volume of the device, and a distance-to-target location of the device.

This gauge information is encoded with a sequence composed of at least one of the endpoints of the continuum (such as the minimum or maximum points) and the current gauge value of the function of interest. For instance, the current volume state of the electronic device can be represented by a sequence of auditory notifications, such as beeps. An initial beep might indicate the minimum or first end point of the volume continuum, a middle beep would indicate the current gauge value or state of volume of the device, and a final beep would indicate the maximum or second end point. In this example, the time between the beep signals would indicate where the parameter of interest (volume) falls. In another auditory example, beeps may become closer together as the device gets closer to a target location. In this example, the time between the auditory notification beeps gets shorter as the target location is approached, and thus the time period between the occurrence of the beeps provides information to the user of the electronic device about where on the continuum of distance to target location the current location falls at any given time, including at least one end point and the where the current gauge value (current location) is located on the continuum. Similarly, as will be discussed, non-visual notifications can be provided by tactile notifications. Indeed, non-visual notifications may be cross-modality, consisting of both auditory and tactile notifications about a single device function of interest.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Therefore, in accordance with certain aspects of the present disclosure, there is provided a method of communicating a quantity that falls within a defined continuum defined by first and second end points, comprising: providing a plurality of non-visual notifications that indicate where on the continuum a current gauge value associated with a function of an electronic device resides relative to at least one end point of the first and second end points of the continuum, wherein the plurality of non-visual notifications comprise a non-visual notification of at least one end point of the continuum and a non-visual notification of the current gauge value.

In accordance with another aspect of the present disclosure, there is provided an electronic device, comprising: a processor; one or more non-visual notification features coupled to and in cooperative arrangement with the processor; and a memory coupled to and in cooperative arrangement with the processor, the processor and the memory configured to: in response to a current gauge value associated with a function of the electronic device, control the one or more non-visual notification features to provide a plurality of non-visual notifications that indicate where on a continuum defined by first and second end points the current gauge value resides relative to at least one end point of the first and second end points, wherein the plurality of non-visual notifications comprise a non-visual notification of the at least one end point of the continuum and a non-visual notification of the current gauge value.

In accordance with still further aspects of the present disclosure, there is provided a non-transitory computer-readable medium having computer-executable instructions for communicating a quantity that falls within a defined continuum defined by first and second end points, comprising: providing a plurality of non-visual notifications that indicate where on the continuum a current gauge value associated with a function of an electronic device resides relative to at least one end point of the first and second end points of the continuum, wherein the plurality of non-visual notifications comprise a non-visual notification of the at least one end point of the continuum and a non-visual notification of the current gauge value.

Referring now to the drawings, FIG. 1 is a block diagram of an electronic device 100 and associated components in which the device, systems and methods disclosed herein may be implemented. In this example, an electronic device 100 is a wireless two-way communication device with voice and data communication capabilities. Such electronic devices communicate with a wireless voice or data network 170 using a suitable wireless communications protocol. Wireless voice communications are performed using either an analog or digital wireless communication channel. Data communications allow the electronic device 100 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities. Thus, the electronic device may be portable, but this is not a requirement.

The illustrated electronic device 100 is an example electronic device that includes two-way wireless communications functions. Such electronic devices incorporate communication subsystem elements such as a wireless transmitter 124, a wireless receiver 120, and associated components such as one or more antenna elements 118 and 122. A digital signal processor (DSP) 126 performs processing to extract data from received wireless signals and to generate signals to be transmitted. The particular design of the communication subsystem is dependent upon the communication network and associated wireless communications protocols with which the device is intended to operate.

The electronic device 100 includes a processor 110, also referred to as a microprocessor, which controls the overall operation of the electronic device 100. The processor 110 interacts with the above described communications subsystem elements and also interacts with other device subsystems such as non-volatile memory 116 and random access memory (RAM) 114. The non-volatile memory 116 and RAM 114, in one example, contain program memory and data memory, respectively. The processor 110 also interacts with various tactile notification features 112, as described below, an auxiliary input/output (I/O) device 130, a Universal Serial Bus (USB) Port 142, a display 136, a keyboard 134, a speaker 138, a microphone 140, a short-range communications subsystem 128, a power subsystem 146, and any other device subsystems. Speaker 138 and receiver 120 of electronic device 100 deliver auditory notifications and thus may serve as auditory notification features of electronic device 100; as will be discussed, when the electronic device is in a speakerphone usage mode, non-visual notification may be auditory notifications delivered through the speaker 138 of the electronic device and when the electronic device is in a phone mode, auditory notifications may be received by the receiver 120 of the electronic device. Further, the processor 110 may interact with an orientation sensor such as an accelerometer 132 that may be used to detect movement of the electronic device 100, including direction of gravitation forces or gravity-induced reaction forces. This detection is particularly helpful when delivery of non-visual notifications does not occur during a hand-free mode of the electronic device, and delivery is postponed until movement following the hands-free mode is detected.

A battery 144 is connected to a power subsystem 146 to provide power to the circuits of the electronic device 100. The power subsystem 146 includes power distribution circuitry for providing power to the electronic device 100 and also contains battery charging circuitry to manage recharging the battery 144. The power subsystem 146 includes a battery monitoring circuit that is operable to provide a status of one or more battery status indicators, such as remaining capacity, temperature, voltage, electrical current consumption, and the like, to various components of the electronic device 100. An external power supply 150 is able to be connected to an external power connection 148.

The USB port 142 further provides data communication between the electronic device 100 and one or more external devices. Data communication through USB port 142 enables a user to set preferences through the external device or through a software application and extends the capabilities of the device by enabling information or software exchange through direct connections between the electronic device 100 and external data sources rather than via a wireless data communication network.

Operating system software used by the processor 110 is stored in non-volatile memory 116. Further examples are able to use a battery backed-up RAM or other non-volatile storage data elements to store operating systems, other executable programs, or both. The operating system software, device application software, or parts thereof, are able to be temporarily loaded into volatile data storage such as RAM 114. Data received via wireless communication signals or through wired communications are also able to be stored to RAM 114.

The microprocessor 110, in addition to its operating system functions, is able to execute software applications on the electronic device 100. A predetermined set of applications that control basic device operations, including at least data and voice communication applications, is able to be installed on the electronic device 100 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. Further applications include applications that have input cells that receive data from a user.

Further applications may also be loaded onto the electronic device 100 through, for example, the wireless network 170, an auxiliary I/O device 130, USB port 142, short-range communications subsystem 128, or any combination of these interfaces. Such applications are then able to be installed by a user in the RAM 114 or a non-volatile store for execution by the microprocessor 110.

In a data communication mode, a received signal such as a text message or web page download is processed by the communication subsystem, including wireless receiver 120 and wireless transmitter 124, and communicated data is provided to the microprocessor 110, which is able to further process the received data for output to the display 136, or alternatively, to an auxiliary I/O device 130 or the USB port 142. A user of the electronic device 100 may also compose data items, such as e-mail messages, using the keyboard 134, which is able to include a complete alphanumeric keyboard or a telephone-type keypad, in conjunction with the display 136 and possibly an auxiliary I/O device 130. Such composed items are then able to be transmitted over a communication network through the communication subsystem.

For voice communications, overall operation of the electronic device 100 is substantially similar, except that received signals are generally provided to a speaker 138 and signals for transmission are generally produced by a microphone 140. Alternative voice or audio I/O subsystems, such as a voice message recording subsystem, may also be implemented on the electronic device 100. Although voice or audio signal output is generally accomplished primarily through the speaker 138, the display 136 may also be used to provide an indication of the identity of a calling party, the duration of a voice call, or other voice call related information, for example.

Depending on conditions or statuses of the electronic device 100, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 128 is a further optional component which may provide for communication between the electronic device 100 and different systems or devices, which need not necessarily be similar devices. For example, the short-range communications subsystem 128 may include an infrared device and associated circuits and components or a Radio Frequency based communication module such as one supporting Bluetooth® communications, to provide for communication with similarly-enabled systems and devices.

A media reader 162 is able to be connected to an auxiliary I/O device 130 to allow, for example, loading computer readable program code of a computer program product into the electronic device 100 for storage into non-volatile memory 116. In one example, computer readable program code includes instructions for performing the communication of a quantity and where that quantity falls on a continuum process, described herein. One example of a media reader 162 is an optical drive such as a CD/DVD drive, which may be used to store data to and read data from a computer readable medium or storage product such as computer readable storage media 160. Examples of suitable computer readable storage media include optical storage media such as a CD or DVD, magnetic media, or any other suitable data storage device. Media reader 162 is alternatively able to be connected to the electronic device through the USB port 142, or computer readable program code is alternatively able to be provided to the electronic device 100 through the wireless network 170.

The subject matter of the present disclosure can be realized in hardware, software, or a combination of hardware and software.

The present subject matter can also be embedded in a computer program product, which comprises the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following: a) conversion to another language, code or, notation; and b) reproduction in a different material form.

Each computer system may include one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, which allows a computer to read such computer readable information.

FIG. 2 is a flow 200 that illustrates an example method for communicating a quantity that falls within a defined continuum defined by first and second end points, in accordance with the present disclosure. At Block 210, a current gauge value associated with a function of an electronic device is determined. As discussed previously, this current gauge value may be one or more of a battery level, wireless signal strength, a volume, a distance to target location function of the device, and other similar measurements. Also the current gauge value may be a memory capacity, a processor speed, and a temperature, or other variables that are monitored by the electronic device. For example, one's car might be able to communicate to the electronic device the amount of fuel left in the fuel tank, how charged the car battery is, the pressure in the car tires, etc. Therefore, other current gauge values associated with a function of the device or with values being monitored by the electronic device may also be measured and determined.

Next, at Block 220, non-visual notifications are provided that indicate where on a continuum the current gauge value resides relative to at least one end point of the first and second end points of the continuum, wherein the non-visual notifications comprise a non-visual notification of at least one end point of the continuum and a non-visual notification of the current gauge value. At Block 230, an alert indicating where the current gauge value resides relative to at least one of the end points and the current gauge value has changed is provided.

Accordingly, it can be seen that flow 200 of FIG. 2 provides a method for communicating a quantity that falls within a defined continuum defined by first and second end points, comprising: providing a plurality of non-visual notifications that indicate where on the continuum a current gauge value associated with a function of an electronic device resides relative to at least one end point of the first and second end points of the continuum, wherein the plurality of non-visual notifications comprise a non-visual notification of at least one end point of the continuum and a non-visual notification of the current gauge value.

FIG. 3 is a flow 300 that illustrates a further method for communicating a quantity that falls within a defined continuum defined by first and second end points, in accordance with the present disclosure. At Block 310, a current gauge value associated with a function of an electronic device is determined. As discussed previously, this current gauge value may be one or more of a battery level, wireless signal strength, a volume, a distance to target location function of the device, and other similar measurements. Also the current gauge value may be a memory capacity, a processor speed, and a temperature, or other variables that are monitored by the electronic device. For example, one's car might be able to communicate to the electronic device the amount of fuel left in the fuel tank, how charged the car battery is, the pressure in the car tires, etc. Therefore, other current gauge values associated with a function of the device or with values being monitored by the electronic device may also be measured and determined.

At Block 320, a usage mode of the electronic device is determined. This usage mode may be a hands-free mode, a phone mode, a speaker-phone mode, etc. The determined usage mode can be used to determine delivery of the non-visual notifications. At Block 330, the non-visual notifications that indicate where on a continuum the current gauge value resides relative to at least one end point of the first and second end points of the continuum are provided in accordance with the determined device usage mode. As previously discussed, the non-visual notifications will include at least one end point of the continuum and the current gauge value. For example, if the electronic device is in a speaker-phone mode, the non-visual notifications are auditory notifications delivered through a speaker of the electronic device. Or, if the electronic device is in a phone mode, the non-visual notifications are auditory notifications received through a receiver of the electronic device. Or, if the electronic device is in a hands-free mode, delivery of the non-visual notifications may be delayed until the device is no longer in that mode, i.e. after the device has been moved. Movement of the device may automatically end the hands-free mode.

Optionally, at Block 340, an alert indication of where the current gauge value resides relative to at least one of the end points and the current gauge value has changed may be provided.

In certain examples, the gauge value may only be communicated after an initial alert signal that indicates that something has just changed, or that something is wrong. This notification may, or may not, occur dependent upon device user request. For instance, a short beep could be used to alert the user of a cellular or smart phone that the cellular connection is becoming dangerously weak while the user is on the phone. The user could then lay her finger on a dedicated region of the phone where she will feel the current strength of the cellular signal using the technical described above.

Thus, it can be seen that a user of the electronic device may be provided with an alert indication that the current gauge value has changed with respect to at least one end point of the continuum. The alert indication may be a non-visual alert indication, such as a beep or a tactile notification, or the alert indication may be a visual alert indication of the electronic device, such as a blinking light on the device. The alert indication may be provided only if requested by a user of the electronic device, or may be automatically provided, as in the case of the electronic device losing signal strength or power, for example.

Therefore, in accordance with the description above, an electronic device 100 has a processor 110; one or more non-visual notification features coupled to and in cooperative arrangement with the processor; and a memory 116 coupled to and in cooperative arrangement with the processor, with the processor and the memory configured to: in response to a current gauge value associated with a function of the electronic device, control the one or more non-visual notification features to provide a plurality of non-visual notifications that indicate where on a continuum defined by first and second end points the current gauge value resides relative to at least one end point of the first and second end points, wherein the plurality of non-visual notifications comprise a non-visual notification of at least one end point of the continuum and a non-visual notification of the current gauge value. The electronic device 100 may have a number of different types of notification features, including the speaker 138 (auditory notification feature), the transmitter 124 which can send an alert to a secondary output device (auditory notification feature), and various tactile notification features 112 (tactile notification features such as capacitive strips and projections), for example, as will be described further below.

The processor 110 and memory 116 can, in cooperative arrangement, cause one or more non-visual notification features to provide a first non-visual notification of a first end point, such as the minimum end point of the continuum or the maximum end point of the continuum, and to also provide a second non-visual notification of the current gauge value relative to the at least one end point of the continuum that indicates where on the continuum the current gauge value resides relative to the at least one end point. The processor can further cause one or more non-visual notification features to provide a third non-visual notification of a second end point (different from the first end point), where the first and second end points of the continuum comprise a minimum value of the continuum and a maximum value of the continuum, respectively, and wherein the current gauge value resides between the first and second end points on the continuum. The processor and the memory may be configured to provide the non-visual notifications in response to a query gesture from a user of the electronic device.

The processor 110 can further control one or more non-visual notification features of the electronic device 100 to selectively deliver non-visual notifications as a function of the usage mode of the electronic device. Thus, the processor and the memory are configured to control the one or more non-visual notification features to not deliver the plurality of non-visual notifications when the electronic device is in, for example, a hands-free mode. Further, the non-visual notification features of the device can be controlled to deliver non-visual notifications when the electronic device is moved after being in the hands-free mode, i.e. the electronic device exits the hands-free mode.

There are other usage modes of the electronic device, such as a speaker-phone mode and a phone mode, which may determine how non-visual notifications are provided to a user of the device. The non-visual notifications can be auditory, tactile, or both. Accordingly, processor 110 and memory 116 are configured to: determine a usage mode of the electronic device and deliver the plurality of non-visual notifications in accordance with the determined usage mode of the electronic device. For example, when it is determined that the usage mode of the electronic device is a speaker-phone mode, the non-visual notifications are auditory notifications and the processor controls speaker 138 of the electronic device to deliver the auditory notifications. Or, when the usage mode of the electronic device 100 is determined to be a phone mode, the non-visual notifications are still auditory notifications, and the processor controls the electronic device to deliver auditory notifications received by receiver 120.

Figure 4:
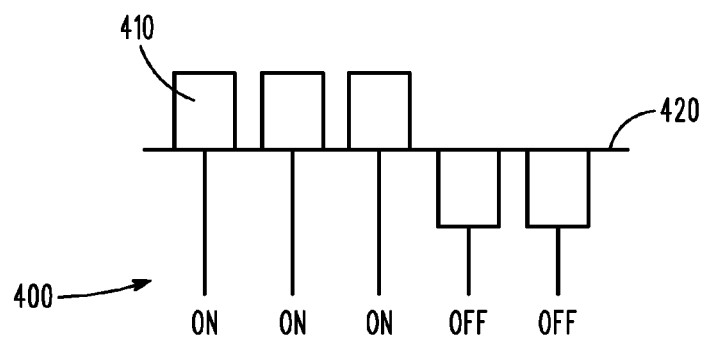
FIGS. 4-6 illustrate tactile non-visual notification features of an example electronic device, in accordance with the present disclosure.
Figure 5:
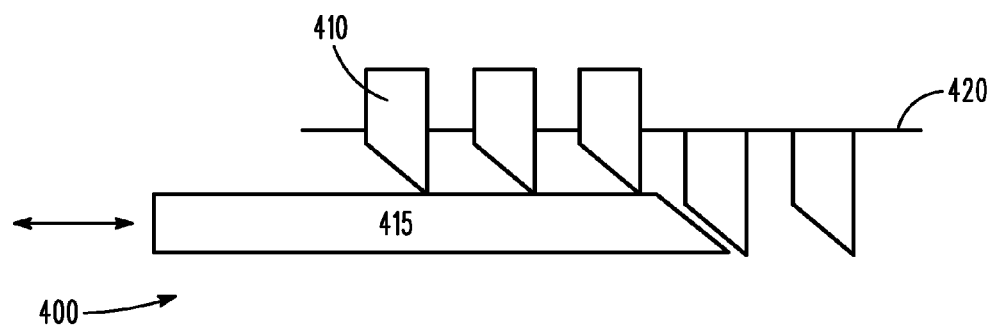
Figure 6:
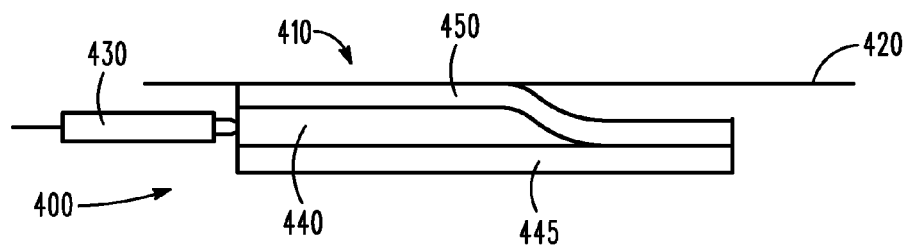

Referring now to FIGS. 4, 5, and 6, the non-visual notifications may be provided by tactile non-visual notification features of the electronic device, with a static tactile notification that indicates the at least one end point of the continuum and a dynamic tactile notification that indicates where on a continuum the current gauge value currently resides. The static tactile notification is a static feature at a surface of the electronic device through which the non-visual notifications are delivered that indicates at least one end point of the continuum (such as the minimum or maximum points) and the dynamic tactile notification is a changeable feature at the surface of the electronic device whose current position is determined by where on the continuum the current gauge value resides. The dynamic tactile notification may be localized to be felt by a user only in the general, localized area of the gauge itself, such as a change in texture at the surface of the electronic device, or the dynamic tactile notification may be a distributed tactile sensation, such as the vibration of the entire electronic device. It is noted that while the surface of the housing of the electronic gauge is discussed, the surface may also refer to the surface of a housing of an accessory device, such as a ring, watch, clip, etc. Moreover, the non-visual notifications may occur in response to a query gesture from a user of the electronic device.

Referring now to FIGS. 4, 5 and 6, some examples of tactile non-visual notification features 400 of an electronic device are shown. In FIG. 4, projections 410 are actuated by solenoid switches to raise and lower in response to an electrical current. The projections 410 may be flush with a surface 420 when in a starting position and moved to a position that is tactilely detectable by a user when actuated. The projections 410 form bars of a gauge to indicate status as a level. In the example of FIG. 4, the user is able to touch the projections 410 and determine that the status of the function indicated is at approximately 60 percent (three out of five bars are actuated). These projections may be felt by the user starting at an end point, such as at the beginning of the projections, and running the user's finger up the bars until the last bar is felt. In FIG. 5, the projections 410 are actuated by an electromechanical cam 415 positioned below the projections 410. The electromechanical cam 415 sequentially forces the projections 410 from a starting position, which may be flush with the surface 420, to a tactilely detectable position above the surface 420. In FIG. 6 a tube, or chamber 440, formed of sidewalls 445 and 450 is fillable by a micro fluid power hydraulic pump 430. Injecting fluid into chamber 440 by pump 430 makes the chamber 440 expand and taking fluid from the chamber causes chamber 440 to contract. The amount of expansion or contraction of chamber 440 is reflected in projection 410 and is indicative of the gauge value to be communicated. The hydraulic pump functions in this manner to create a single projection 410 that shortens and/or lengthens to indicate a current gauge value. Similar to FIG. 4, the non-visual tactile notification features 400 of FIGS. 5 and 6 are gauges, which tactilely indicate a gauge level to a user.

The non-visual tactile notification features 400 may be a single projection that is movable from a starting position to a tactilely detectable position in order to indicate a status. Alternatively other mechanisms capable of changing a texture at a surface for a period of time may be used. An electronic device may include any number of non-visual tactile notification features 400 at different housing surface locations. The non-visual tactile notification features 400 may be gauges, individual projections or a combination of both. Although the status indicators are shown as projections, the non-visual tactile notification features 400 may instead be depressions or a combination of depressions and projections.

Figure 7:
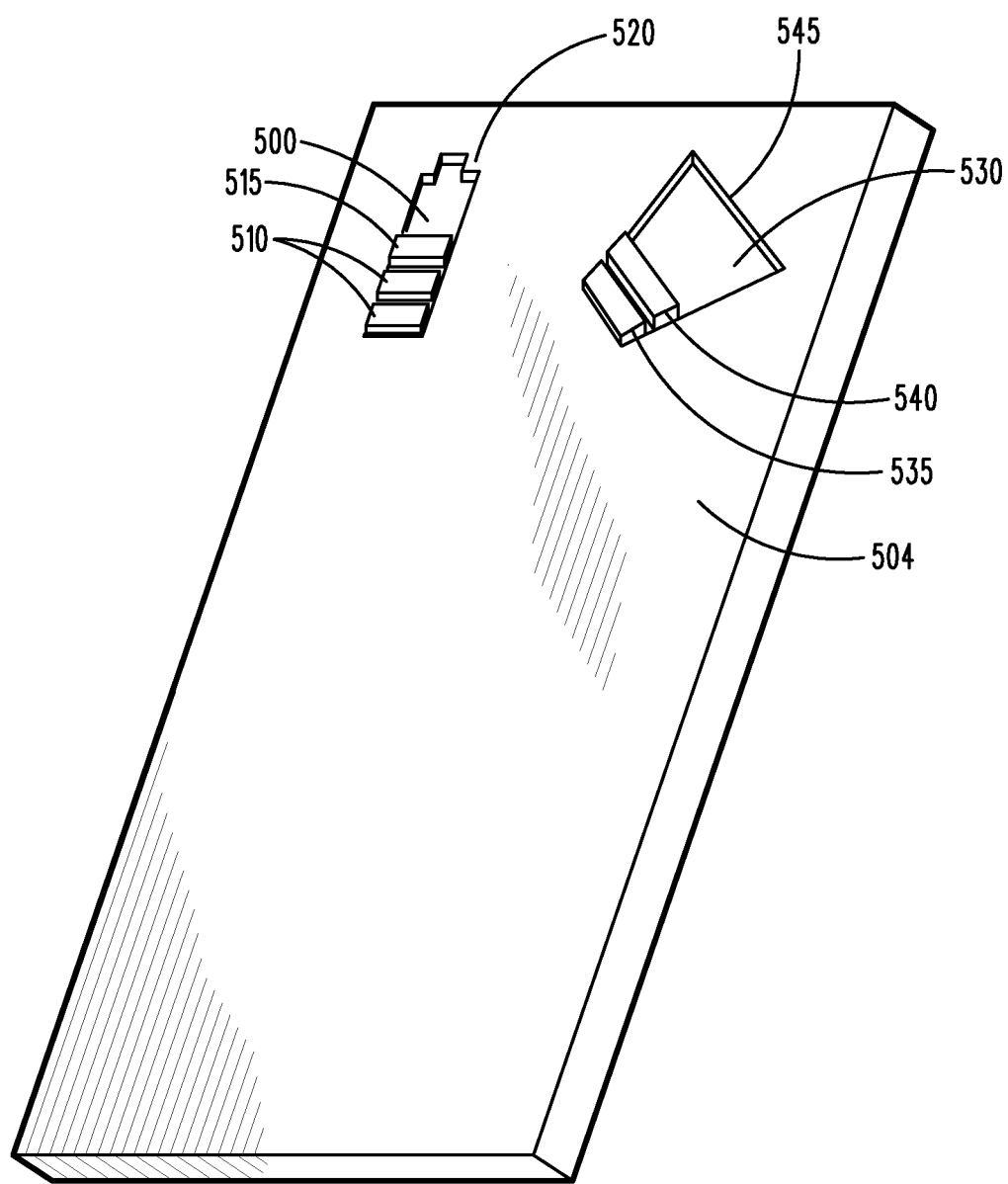
FIG. 7 illustrates multiple gauges formed by tactile non-visual notification features of an example electronic device, in accordance with the present disclosure.
Figure 8:
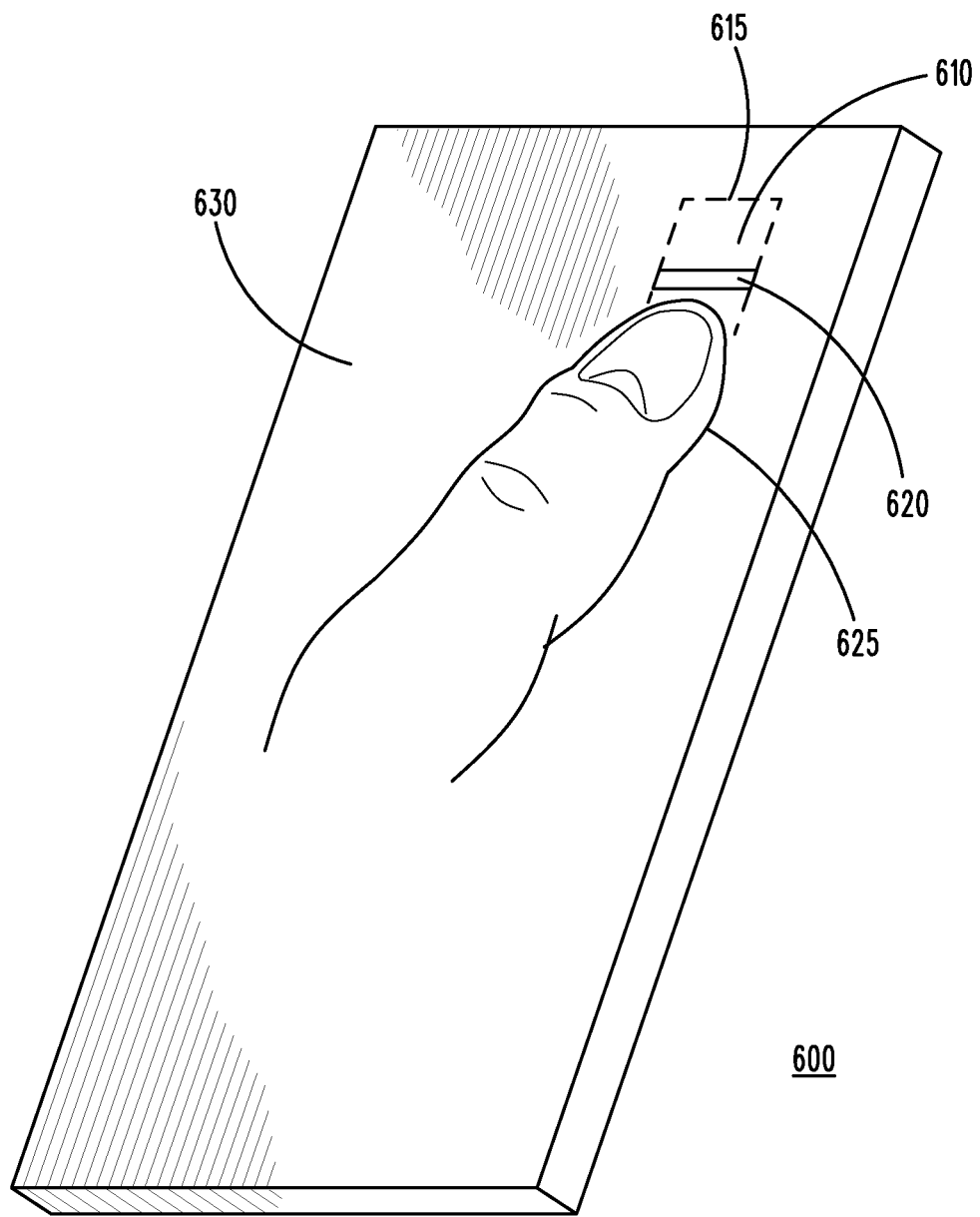
FIG. 8 illustrates an example gauge formed by tactile non-visual notification features of an electronic device, in accordance with the present disclosure.

Referring now to FIG. 7, multiple gauges may be used to present non-visual gauge information to a user of an electronic device. In this example, the housing of electronic device is seen to have a battery level gauge 500 and a signal strength gauge 530.

In the present example, with a battery level gauge 500 that indicates strength of a battery and a signal strength gauge 530 that indicates signal strength of a wireless network, both gauges 500 and 530 are provided on a back 504 of the portable electronic device 100. The device determines a current battery level gauge value and a current signal strength gauge value, indicated by dynamic tactile notification features 515 and 540, respectively, in the drawing. The gauges 500 and 530 are actuated to indicate these current gauge values of gauges 500 and 530. Each gauge has minimum end points 510 and 535, respectively, and maximum end points 520 and 545, respectively, that serve as static tactile notification features of the electronic device that do not change. In the given example, the battery level gauge 500 has three (out of five) projections 515 in a tactilely detectable position to indicate a battery level of approximately 60 percent. The user, starting at the base of the gauge 510 (the minimum end point) can slowly swipe his finger up the gauge and feel the three raised projections, indicating a current battery level of 60%. Alternately, only the third bar of the projection may be actuated or raised, and a battery level of 60% would still be conveyed to the user by the third raised bar. The signal strength gauge 530 has two projections 540 that serve as tactile notifications to the user of a current signal strength of the electronic device of approximately 40 percent. Additionally, a single indicator could be moved along the gauge to provide indication of a current gauge value.

Alternately, multiple gauges may be present at the same time in the form of capacitive strips that reside at the back of the device. Each strip would correspond to a different type of information, such as current volume level, current signal strength, current GPS distance to target location, current battery level, etc. To read the state of a gauge, the user would lay her finger at the bottom of the capacitive strip (the minimum end point of the continuum) for that gauge and slowly swipe it upwards towards the other end (the maximum end point of the continuum) of the strip. As soon as her finger reaches the current value of the gauge, the user would feel a tactile signal. For instance, if the cellular strength is 40%, then the user would feel the tactile signal when her finger is slightly less than halfway up the capacitive strip.

Reference is made to FIG. 6 to describe another example of communicating where a current gauge value associated with a function of an electronic device falls on a continuum between first and second end points of the gauge 600. In the present example, the non-visual notification gauge 610 is a material that has a surface texture that may be electrically controlled and may be located on a back 630 of the portable electronic device 100 as shown. The gauge 610 has two end points 615 and 625 that serve as the static tactile notification features of the gauge, while dynamic tactile notification feature 620 indicates the current gauge level and is changeable.

When the device determines the current gauge value, such as the current signal strength associated with the wireless network, in the case of a signal strength gauge, the non-visual notification gauge 610 is actuated to change a texture at the back 630 of the electronic device 100 to indicate the current signal strength. The non-visual notification gauge 610 causes the material to harden locally for a period of time. The hardened portion of the material may not be detected visually but may be detected tactilely, as shown in FIG. 9.

Figure 9:
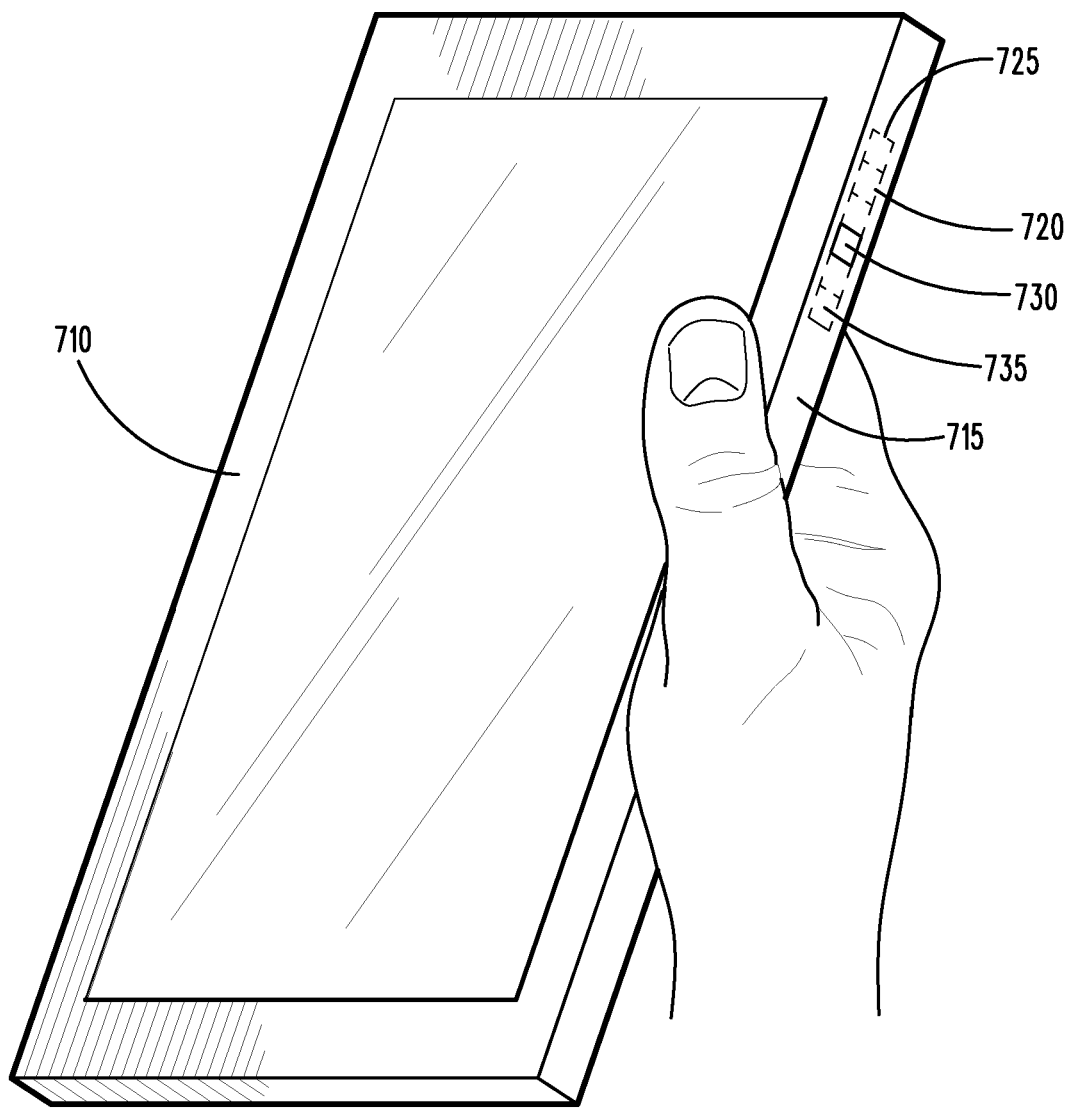
FIG. 9 illustrates yet another example gauge formed by tactile non-visual notification features of an electronic device, in accordance with yet another aspect of the present disclosure.

Reference is made to FIG. 9 to describe yet another example of a tactile non-visual notification gauge that can portray where a current gauge value associated with a function of an electric device falls on a continuum between first and second end points. In the present example, the tactile gauge 700 is provided on a side 715 of a housing 710 of an electronic device and at least partly aligned with opening 720 of the electronic device 100. The tactile gauge 700 has static tactile notification features 725 and 735 that correspond to the end points of the continuum of the gauge. A current gauge value is communicated by dynamic tactile notification feature 730 of gauge 700 and one or more projections may be actuated to change a texture at the side 715 to indicate the current value.

In addition to being capable of being actuated to indicate a current gauge value, the projections 730 of the gauge may also detect a user input in the form of a touch or a pressure. When a user input is received, the volume may be increased or decreased in response, in the case of a volume gauge, for example. Therefore, the gauge 700 in the example functions as both a volume adjustment device as well as a volume gauge. The gauge 700 facilitates tactile adjustment of the volume without requiring the user to look at a visual, graphic indicator.

It is understood that any manner of tactile signals can be generated, in addition to those described in connection with FIGS. 4, 5, 6, 7, 8 and 9, above, so long as a sequence of brief tactile signals is generated. At least two non-visual notifications are provided: at least one static tactile notification indicates at least one end point of the continuum and a dynamic tactile notification indicates where on the continuum the current gauge value currently resides. The tactile notification may be a localized sensation or it may be a distributed tactile sensation over the entire electronic device.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

It will be appreciated that any module or component disclosed herein that executes instructions may include or otherwise have access to non-transient and tangible computer readable media such as storage media, computer storage media, or data storage devices (removable or non-removable), i.e. magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology; CD-ROM, digital versatile disks (DVD) or other optical storage; magnetic cassettes, magnetic tape, magnetic disk storage or other magnetic storage devices; or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for communicating a current gauge value associated with a function of an electronic device that falls within a defined continuum defined by first and second end points, the method comprising:
   determining a usage mode of the electronic device; and
   providing a plurality of non-visual notifications that indicate where on the continuum the current gauge value resides relative to first and second end points of the continuum, the plurality of non-visual notifications comprising:
      a first non-visual notification of the first end point of the continuum;
      a second non-visual notification of the current gauge value that indicates where on the continuum the current gauge value resides relative to the first and second end points; and
      a third non-visual notification of the second end point of the continuum,
   wherein the first and second end points of the continuum comprise a minimum value of the continuum and a maximum value of the continuum, respectively, and wherein the current gauge value resides between the first and second end points on the continuum, and
   wherein the plurality of non-visual notifications comprises:
      a plurality of auditory notifications when the usage mode of the electronic device is a speaker phone mode; and
      a plurality of auditory and/or tactile notifications when the usage mode of the electronic device is not a speaker phone mode,
   the method further comprising:
      postponing provision of the plurality of non-visual notifications until motion of the electronic device is detected by an accelerometer of the electronic device when the usage mode is determined to be a hands-free mode.

2. The method of claim 1, wherein the current gauge value is associated with at least one of: a battery level, a wireless signal strength, a volume, a distance to target location function of the electronic device, a memory capacity, a processor speed, and a temperature.

3. The method of claim 1, wherein the plurality of non-visual notifications comprises a plurality of tactile notifications and further comprising:
   providing a static tactile notification of the plurality of tactile notifications that indicates the at least one end point of the continuum; and
   providing a dynamic tactile notification of plurality of tactile notifications that indicates where on the continuum the current gauge value currently resides.

4. The method of claim 3, wherein the static tactile notification is provided by a static feature at a surface of the electronic device that indicates the at least one end point of the continuum and further comprising:
   controlling a dynamic tactile non-visual notification feature to indicate where on the continuum the current gauge value resides with respect to a static tactile non-visual notification feature that provides the static tactile notification.

5. The method of claim 4, further comprising:
   controlling the dynamic tactile non-visual notification feature to effect a change in texture at the surface of the electronic device.

6. The method of claim 4, further comprising:
controlling the dynamic tactile non-visual notification feature to create a distributed tactile sensation of the electronic device.

7. A method for communicating a quantity that falls within a defined continuum defined by first and second end points, comprising:
providing a plurality of non-visual notifications that indicate where on the continuum a current gauge value associated with a function of an electronic device resides relative to the first and second end points of the continuum, the plurality of non-visual notifications comprising:
an initial beep indicating the first end point of the continuum;
a middle beep indicating the current gauge value, and
a final beep indicating the second end point,
where the time between the beep signals is controlled to indicate where on the continuum the current gauge value resides relative to the first and second end points.

8. A non-transitory computer-readable medium comprising instructions for performing the method of communicating a quantity that falls within a defined continuum defined by first and second end points, the quantity associated with a function of an electronic device operable in a hands-free mode, a speaker-phone mode and a phone mode, the method comprising:
providing a plurality of non-visual notifications that indicate where on the continuum a current gauge value associated with a function of an electronic device resides relative to at least one end point of the first and second end points of the continuum, the plurality of non-visual notifications comprising a non-visual notification of the at least one end point of the continuum and a non-visual notification of the current gauge value;
determining which mode of the hands-free mode, the speaker-phone mode, and the phone mode the electronic device is operating in;
not delivering the plurality of non-visual notifications while the electronic device is in the hands-free mode;
delivering a plurality of auditory non-visual notifications through a speaker of the electronic device while the device is in the speaker-phone mode; and
delivering a plurality of auditory notifications through the electronic device while the device is in the phone mode.

9. An electronic device usable in a phone mode, a hands-free mode, and a speaker-phone mode, comprising:
an accelerometer;
a processor responsive to the accelerometer;
one or more non-visual notification features coupled to and in cooperative arrangement with the processor; and
a memory coupled to and in cooperative arrangement with the processor, the processor, the accelerometer and the memory configured to:
in response to a current gauge value associated with a function of the electronic device, determine the one or more non-visual notification features to provide a plurality of non-visual notifications that indicate where on a continuum defined by first and second end points the current gauge value resides relative to at least one end point of the first and second end points, the plurality of non-visual notifications comprising a non-visual notification of the at least one end point of the continuum and a non-visual notification of the current gauge value;
determine a usage mode of the electronic device; and
deliver the plurality of non-visual notifications in accordance with the determined usage mode,
where delivering the plurality of non-visual notifications in accordance with the determined usage mode comprises:
while the electronic device is in the hands-free mode, postponing delivery of the plurality of non-visual notifications until the accelerometer detects movement of the electronic device;
delivering a plurality of auditory non-visual notifications through a speaker of the electronic device while the device is in the speaker-phone mode; and
delivering a plurality of auditory notifications through the electronic device while the device is in the phone mode.

10. The device of claim 9, the processor and the memory further configured to:
provide a first non-visual notification of a first end point of the at least one end point;
provide a second non-visual notification of the current gauge value relative to the at least one end point of the continuum that indicates where on the continuum the current gauge value resides relative to the at least one end point; and
provide a third non-visual notification of a second end point of the at least one end point, wherein the first and second end points of the continuum comprise a minimum value of the continuum and a maximum value of the continuum, respectively, and wherein the current gauge value resides between the first and second end points on the continuum.

11. The device of claim 9, wherein the current gauge value is associated with at least one of: a battery level, a wireless signal strength, a volume, a distance to target location function of the electronic device, a memory capacity, a processor speed, and a temperature.

12. The device of claim 9, wherein the plurality of non-visual notifications comprise a plurality of tactile notifications and the device further comprising:
a static tactile non-visual notification feature representative of the at least one end point of the continuum; and
a dynamic tactile non-visual notification feature representative whose location is variable,
wherein the processor and the memory are further configured to:
control the dynamic tactile non-visual notification feature to indicate where on the continuum the current gauge value currently resides.

13. The device of claim 12, the processor and the memory further configured to:
control the dynamic tactile non-visual notification feature to change a static texture at a surface of the electronic device.

14. The device of claim 12, the processor and the memory further configured to:
control the dynamic tactile non-visual notification feature to create a distributed tactile sensation of the electronic device.

15. The device of claim 9, wherein the plurality of non-visual notifications comprises a plurality of auditory notifications and wherein the processor and the memory are further configured to:
control a time period between occurrence of a non-visual auditory notification of the at least one end point and a non-visual auditory notification of the current gauge value to indicate wherein on the continuum the current gauge value resides relative to the at least one end point.

16. The device of claim 9, the processor and the memory further configured to:
provide an alert indication that the current gauge value has changed with respect to the at least one end point, wherein the alert indication is one or more of a non-visual alert indication and a visual alert indication of the electronic device.

17. The electronic device of claim 9, where delivering the plurality of non-visual notifications in accordance with the determined usage mode comprises:
delivering the plurality of non-visual notifications as tactile notifications when usage mode is not a phone mode, a hands-free mode, or a speaker-phone mode.

18. A method for communicating a quantity that falls within a defined continuum defined by first and second end points, comprising:
providing a plurality of non-visual notifications that indicate where on the continuum a current gauge value associated with a function of an electronic device resides relative to at least one end point of the first and second end points of the continuum, the plurality of non-visual notifications comprising: a non-visual notification of the at least one end point of the continuum and a non-visual notification of the current gauge value;
determining a usage mode of the electronic device; and
delivering the plurality of non-visual notifications in accordance with the determined usage mode,
where the usage mode is one of a phone mode, a hands-free mode, and a speaker-phone mode, and where delivering the plurality of non-visual notifications in accordance with the determined usage mode comprises:
not delivering the plurality of non-visual notifications while the electronic device is in the hands-free mode;
delivering a plurality of auditory non-visual notifications through a speaker of the electronic device while the device is in the speaker-phone mode; and
delivering a plurality of auditory notifications through the electronic device while the device is in the phone mode,
where not delivering the plurality of non-visual notifications while the electronic device is in the hands-free mode comprises:
postponing delivery of the plurality of non-visual notifications until motion of the electronic device is detected by an accelerometer of the electronic device.

19. The method of claim 18, further comprising:
providing an alert indication that the current gauge value has changed with respect to the at least one end point, wherein the alert indication is one or more of a non-visual alert indication and a visual alert indication of the electronic device.

20. The method of claim 18, where delivering the plurality of non-visual notifications in accordance with the determined usage mode comprises:
delivering the plurality of non-visual notifications as tactile notifications when usage mode is not a phone mode, a hands-free mode, or a speaker-phone mode.

* * * * *